UNITED STATES PATENT OFFICE.

WALTER GLAESER, OF BROOKLYN, NEW YORK, ASSIGNOR, BY MESNE ASSIGNMENTS, TO POTASH EXTRACTION CORPORATION, OF NEW YORK, N. Y., A CORPORATION OF NEW YORK.

METHOD OF TREATING PHOSPHATE ROCK.

1,387,151.      Specification of Letters Patent.      Patented Aug. 9, 1921.

No Drawing.      Application filed May 1, 1916. Serial No. 94,603.

*To all whom it may concern:*

Be it known that I, WALTER GLAESER, a subject of the German Emperor, and a resident of Brooklyn, county of Kings, and State of New York, have invented a new and useful Improvement in Methods of Treating Phosphate Rock, of which following is a specification, the principle of the invention being herein explained and the best mode in which I have contemplated applying that principle, so as to distinguish it from other inventions.

The present invention relates to the processes for treating phosphate containing rock, in order to render the phosphate content thereof water soluble and available for use as a fertilizer. There are large deposits of phosphate rock throughout this and other countries, but this rock in its native state is not adapted for use as a fertilizer as the phosphate content is practically insoluble in water. To the accomplishment of the foregoing and related ends, said invention, then, consists of the means hereinafter set forth and particularly pointed out in the claims.

The following description sets forth in detail one approved method of carrying out the invention, such disclosed mode, however, constituting but one of the various ways in which the principle of the invention may be used.

The present process consists, briefly stated, in grinding the phosphate rock to a suitable degree of fineness, preferably to a 60 mesh screen and then heating a mixture of the powdered phosphate rock with sodium carbonate, powdered carbon, and silica, the temperature depending upon the amount of silica which is used. The product resulting from this heating may be used either directly, as a fertilizer, since it contains the phosphate in a water soluble form, or the latter may be leached out with water and if so removed will preferably be treated with carbonic acid in order to form the diabasic salt from the tribasic salt which is the form in which the phosphate is present in the furnaced mass.

The amount of silica, which will preferably be used in the form of sand, will depend upon the purity of the phosphate rock, since the higher the grade of this rock, the more sand must be used to secure a complete reaction. On the other hand, a low grade of phosphate rock may not require any sand at all, since the addition of the sand is primarily for the purpose of raising the fusing point of the mixture. Similarly the amount of carbon which is used, which is preferably in the form of powdered coal or coke, will depend upon the amount of sand. Preferably sodium carbonate to the extent of about 20% of the weight of the phosphate rock used, will be added to the mixture.

The mixture can best be heated in a rotary open kiln, the temperature depending upon the amount of sand in the mixture. If no sand is added the mixture should be heated at a low red heat for a considerable period, while if sand is present, the present mixture can be heated at higher temperatures without causing any fusion, which must be avoided. The reactions which take place during the heating of the mixture are represented by the following equations:—

(1)   $Ca_3P_2O_8 + 3Na_2CO_3 = 2Na_3PO_4 + 3CaCO_3$
(2)   $3CaCo_3 = 3CaO + 3CO_2$
(3)   $3C + 3O_2 = 3CO_2$
(4)   $3CaO(\text{from } 2) + 3 CO_2(\text{from } 3) = 3CaCo_3$ Thus:—

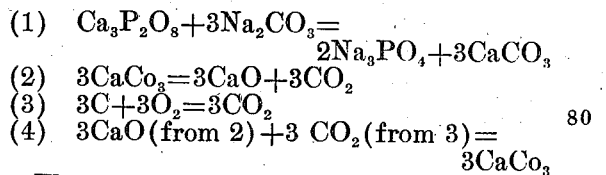

When sand is added to the mixture, the reactions may be represented:—

(1)   $3SiO_2 + 3Na_2CO_3 = 3Na_2SiO_3 + 3CO_2$
(2)   $Ca_3P_2O_8 + 3Na_2SiO_3 = 2Na_3PO_4 + 3CaSiO_3$

Thus:—

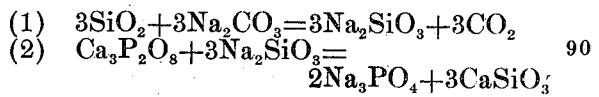

The resulting water soluble phosphate is leached out by the action of water, and is then subjected to the action of carbonic acid gas, which can be conveniently accomplished by passing products of combustion through the solution, the reaction which takes place being represented by the following equation:

(1)   $2Na_3PO_4 + 2H_2O = 2Na_4HPO_4 + 2NaOH$
(2)   $2Na_2HPO_4 + 2NaOH + CO_2 = 2Na_2HPO_4 + Na_2CO_3 + H_2O$

The dibasic sodium phosphate which is formed upon the treatment with carbonic acid gas, can now be separated from the carbonate in the solution by crystallization.

The present method is a relatively simple and inexpensive means for rendering a hitherto waste product of considerable commercial value, and since little apparatus is required for carrying out the various steps of the process, the invention can be carried out in almost any locality, close to the deposits of phosphate rock.

The preferred proportions of materials which are used in the present process are ordinarily 100 parts of sodium carbonate, 20 parts of carbon, 10 parts of sand for low grade phosphate rock, and 30 parts for high grade phosphate rock, the mixture being heated preferably to between 600 and 700 degrees centigrade. The above proportions are all by weight.

Other modes of applying the principle of my invention may be employed instead of the one explained, change being made as regards the process herein disclosed, provided the step or steps stated by any one of the following claims or the equivalent of such stated step or steps be employed.

I therefore particularly point out and distinctly claim as my invention:—

1. A process of treating phosphate rock, the steps of which consist in grinding phosphate rock, heating the same with sodium carbonate and carbon, leaching out the water soluble phosphate product and treating the same with carbonic acid.

2. A process of treating phosphate rock, the steps of which consist in grinding phosphate rock to a fineness of a sixty-mesh screen, heating it in the presence of air with a mixture of finely divided soda ash, coke and sand above a low red heat, leaching out the water soluble phosphate product, passing carbonic acid gas through such solution, and then crystallizing out the sodium carbonate that is formed.

Signed by me this 28 day of April, 1916.

WALTER GLAESER.

Attested by: —
   D. T. DAVIES,
   F. M. RECKTENWALT.